(12) United States Patent
Bamdhamravuri et al.

(10) Patent No.: US 11,947,418 B2
(45) Date of Patent: Apr. 2, 2024

(54) REMOTE ACCESS ARRAY (71) Applicant: INTERNATIONAL BUSINESS MACHINES CORPORATION, Armonk, NY (US)

(72) Inventors: Ram Sai Manoj Bamdhamravuri, Boston, MA (US); Robert J Sonnelitter, III, Bedford Hills, NY (US); Ulrich Mayer, Weil im Schoenbuch (DE); Chad G. Wilson, Palo Alto, CA (US); Avery Francois, East Schodack, NY (US)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 17/808,271

(22) Filed: Jun. 22, 2022

(65) Prior Publication Data
US 2023/0418707 A1 Dec. 28, 2023

(51) Int. Cl.
*G06F 11/10* (2006.01)
*G06F 3/06* (2006.01)

(52) U.S. Cl.
CPC .......... *G06F 11/106* (2013.01); *G06F 3/0619* (2013.01); *G06F 3/0631* (2013.01); *G06F 3/0644* (2013.01); *G06F 3/0673* (2013.01); *G06F 11/1068* (2013.01)

(58) Field of Classification Search
None
See application file for complete search history.

(56) References Cited

U.S. PATENT DOCUMENTS

| | | | |
|---|---|---|---|
| 9,411,730 B1* | 8/2016 | Daly | G06F 12/0815 |
| 10,592,424 B2 | 3/2020 | Beard | |
| 10,747,679 B1* | 8/2020 | Larson | G06F 12/1027 |
| 11,314,635 B1* | 4/2022 | Volpe | G06F 11/1004 |
| 2004/0117563 A1* | 6/2004 | Wu | G06F 9/52 |
| | | | 711/E12.019 |
| 2004/0117579 A1* | 6/2004 | Wu | G06F 12/0866 |
| | | | 711/170 |

(Continued)

OTHER PUBLICATIONS

Disclosed Anonymously, "Method for Filtering Internal Snoop Events Using Qualified Coherence States," IP.com Prior Art Database Technical Disclosure, IP.com No. IPCOM000128944D, Sep. 21, 2005, 5 pgs.

(Continued)

*Primary Examiner* — Daniel F. McMahon
(74) *Attorney, Agent, or Firm* — Caleb D. Wilkes (57) ABSTRACT

A computer system and a method implementing a remote access array are provided. A first drawer includes a first processor chip. A first main memory region is operatively connected to the first processor chip. A first non-addressable memory region is operatively connected to the first processor chip and includes the first remote access array. The first remote access array is configured to track data portions that are stored in the first main memory region and for which copies were created and sent to an external node. The first remote access array is backed up in the first main memory region. The first remote access array includes one or more entries and is configured to update all of the entries in response to a multi-drawer working partition being reduced to fit within the first drawer.

20 Claims, 4 Drawing Sheets

(56) References Cited

U.S. PATENT DOCUMENTS

| | | | |
|---|---|---|---|
| 2006/0080508 A1 | 4/2006 | Hoover | |
| 2010/0318626 A1* | 12/2010 | Abts | G06F 12/0813 709/216 |
| 2017/0185515 A1 | 6/2017 | Fahim | |
| 2020/0042343 A1* | 2/2020 | Wang | G06F 9/45558 |
| 2021/0019069 A1* | 1/2021 | Sen | G06F 3/0644 |
| 2021/0248124 A1* | 8/2021 | Tobin | G06F 12/0882 |
| 2022/0222118 A1* | 7/2022 | Wang | G06F 12/1063 |

OTHER PUBLICATIONS

Liu, "EITF20: Computer Architecture, Part 5.2.1: 10 and MultiProcessor," Lund University, 2016, 62 pgs.

Mell et al., "The NIST Definition of Cloud Computing", National Institute of Standards and Technology, Special Publication 800-145, Sep. 2011, pp. 1-7.

Unknown, "Controlling Which Devices Are Snooped for Each Transaction on a Snooping Multi-Processor Bus," IP.com Prior Art Database Technical Disclosure, IP.com No. IPCOM000147545D, Mar. 19, 2007, 4 pgs.

Unknown, "Detecting Uncached Areas of Memory to Augmenting a Cache Directory That Filters the Distribution of Snoop Commands," IP.com Prior Art Database Technical Disclosure, IP.com No. IPCOM000147544D, Mar. 19, 2007, 4 pgs.

Unknown, "Method and Apparatus for Cooperative State Prefetching in Clustered Shared Memory Multiprocessor Systems with Region Coherence Arrays," IP.com Prior Art Database Technical Disclosure, IP.com No. IPCOM000180817D, Mar. 17, 2009, 7 pgs.

* cited by examiner

REMOTE ACCESS ARRAY

BACKGROUND

The present invention relates generally to computer hardware and processors, e.g., to computer systems with a non-uniform memory access (NUMA) architecture with processors, memory, and input/output buses and with aggregate memory sharing across nodes.

SUMMARY

According to one exemplary embodiment, a computer system is provided which includes a first drawer, a first main memory region, and a first non-addressable memory region. The first drawer includes a first processor chip. The first main memory region is operatively connected to the first processor chip. The first non-addressable memory region is operatively connected to the first processor chip and includes a first remote access array. The first remote access array is configured to track data portions that are pulled from the first main memory region and sent to an external node. The first remote access array is backed up in the first main memory region.

According to one exemplary embodiment, a method for data tracking is provided. A bit is set in a first remote access array in response to a data portion being pulled from a first main memory region and sent to an external node. The first remote access array is stored in a first non-addressable memory region operatively connected to the first processor chip of a first drawer. The first remote access array is backed up in the first main memory region.

According to another exemplary embodiment, a computer system is provided which includes a first drawer, a first main memory region, and a first non-addressable memory region. The first drawer includes a first processor chip. The first main memory region is operatively connected to the first processor chip. The first non-addressable memory region is operatively connected to the first processor chip and includes a first remote access array. The first remote access array is configured to track data portions that are pulled from the first main memory region and sent to an external node. The first remote access array includes one or more entries and is configured to scrub all of the entries in response to a multi-drawer working partition being shrunk to fit within the first drawer.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide computer systems and methods for operating a remote access array in order to reduce the frequency of system snoops and their resulting negative impact on system performance. In a multi-processor with multiple levels of caches and memory placed in a clustered NUMA structure, processor fetch requests have traditionally snooped each cache in the hierarchy before seeking a desired data portion from the main memory. When lateral NUMA domains and caches have directory content which is not shared, a computer system may perform snoops to investigate and evaluate data that is stored in other nodes of the system. On a fetch miss, one or more lateral caches may be snooped to determine if the desired data resides in any of the domains of the lateral caches. Each such snoop consumes cross-domain bandwidth and extends a controller busy time for signals in the system. Accessing the main memory directly might require less time than is needed to complete the lateral snoops, but the system may wait to receive the response from the lateral snoops. Such factors can hinder and slow the progress of a fetch request, increase a time duration of a fetch request, and negatively impact overall system performance.

Therefore, it may be advantageous to, among other things, provide a way to reduce the frequency of such lateral snoops and to better manage a system which manages such lateral snoops. The following described embodiments provide computer systems and methods which improve computer processing hardware by implementing one or more remote access arrays which reduce the latency of local node misses for data portions that are moved across nodes, reduce the number of requests that are sent on node-to-node links and thereby conserve bandwidth on those links, save power by avoiding certain cache array lookups on non-home nodes, and conserve physical space on a node by reducing the number of state machines required to process off-drawer requests. The present embodiments help avoid some performance penalties and help improve processing speed. Thus, a computer system with the improved hardware features described herein may execute faster and improve system performance by using data portions sourced from memory without snooping all the lateral nodes. The present embodiments reduce data sourcing time, reduce cross-link bandwidth, and minimize the resource busy time for the local node fetch misses.

The remote access arrays may include a snoop filter directory per memory port that tracks the lines pulled from the home memory node to a non-home memory node. Whenever a line of data is accessed by a remote processor, a bit for that line in the remote access array is set. If the remote access array bit is set for a line, the non-home node may have the line in use remotely and local memory access must wait for a coherency response from the remote node. If the remote access array bit is not set for a line, then the non-home node does not have a copy of the line and local memory access can proceed immediately. On a miss on the local processor cache on the home node, the remote array state may be checked to see if the line on the remote node is a state that requires a snoop to be sent. The remote access array content may be backed up in the main memory.

An external node may refer to another component with its own computing components, e.g., its own processor and/or own memory, and for which a data transmission penalty is incurred when a data transmission to the external node is carried out. For example with respect to a first node, an external node to that first node is any node which has a significantly greater, e.g., at least ten times greater, data transmission burden as compared to another local data flow path available to the first node. This data transmission burden may refer to a latency (speed) determination and/or to an amount of energy and/or power required to produce the data transmission. The data transmission may be to source data and/or for a query. The remote access array described herein is implemented to avoid unnecessary transmissions down this penalty-inducing path to the external node.

Figure 1:
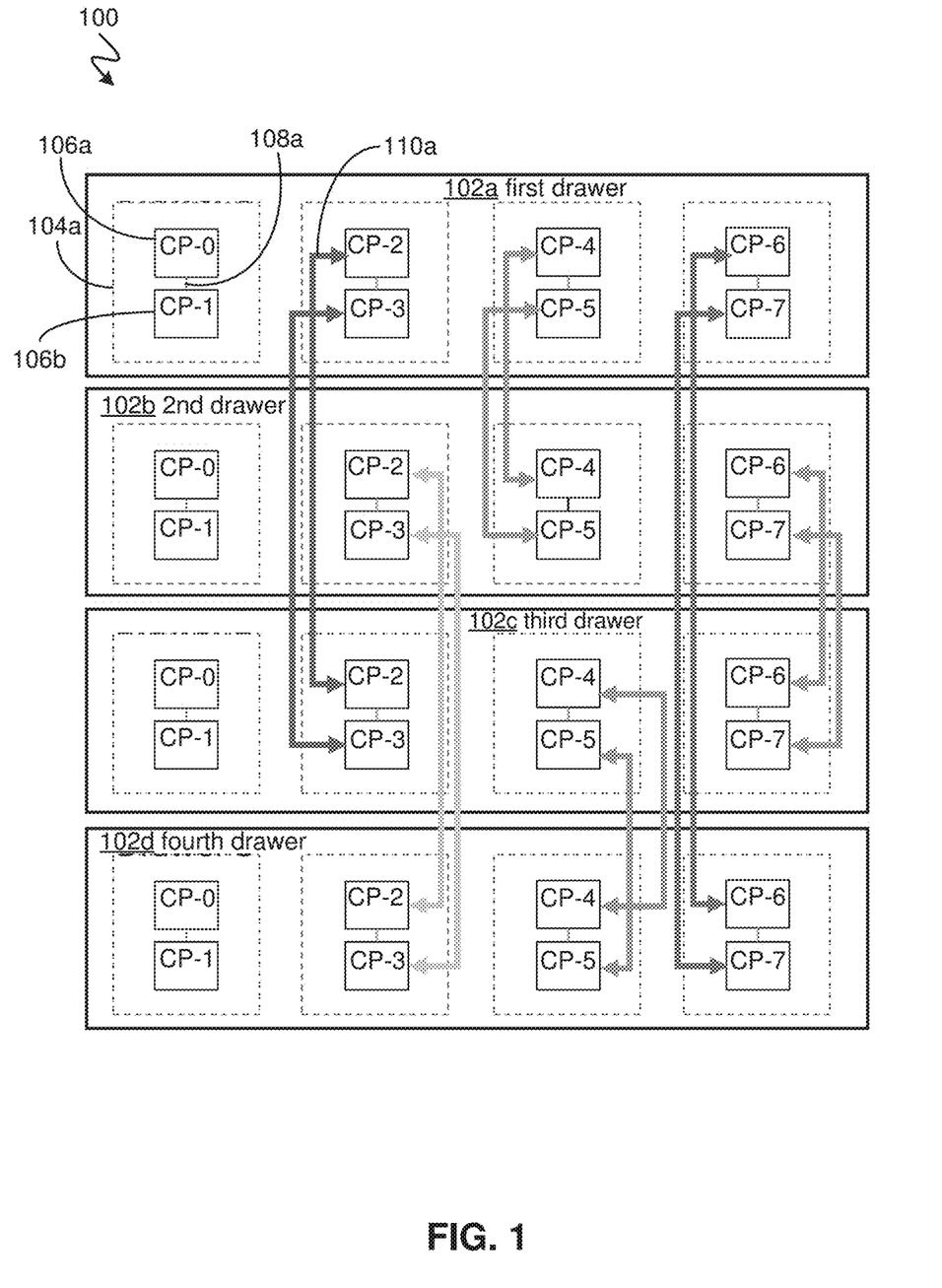
FIG. 1 is a block diagram illustrating a multi-drawer architecture in which a remote access array may be implemented in accordance with at least one embodiment.
Figure 2:
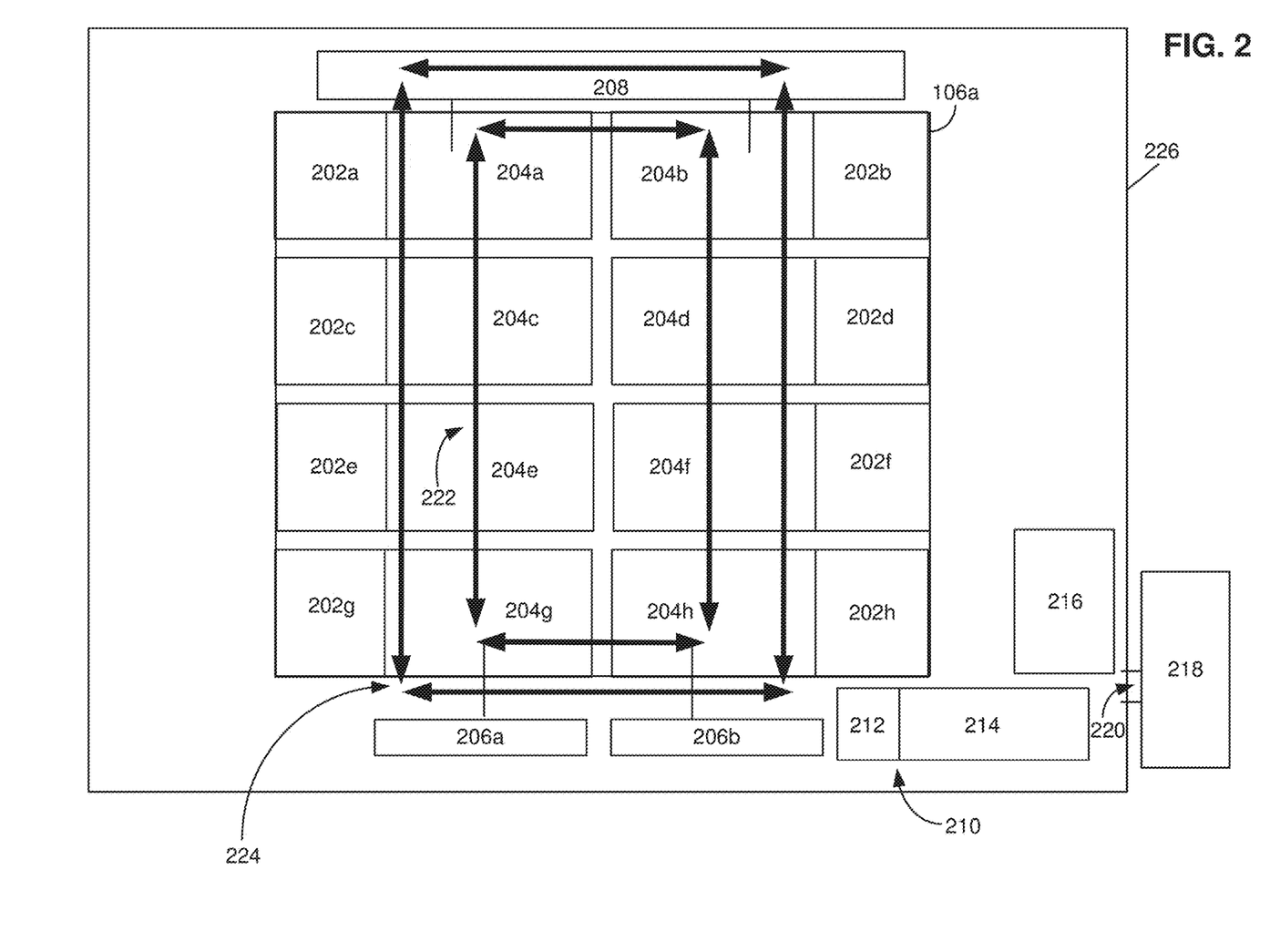
FIG. 2 is a processor chip architecture which includes a remote access array according to at least one embodiment and which shows an example of one of the processor chips depicted in FIG. 1.

Referring now to FIG. 1, a multi-drawer structure 100 in accordance with an embodiment of the present invention is shown. The multi-drawer structure 100 that is depicted includes four drawers, namely a first drawer 102a, a second drawer 102b, a third drawer 102c, and a fourth drawer 102d. Other embodiments of multi-drawer structures may include some other number of multiple drawers besides four. As depicted, each of the drawers may include eight processor chips that are paired into groups of two. For example, the first drawer 102a includes a first processor chip 106a and a second processor chip 106b that are grouped together as a pair of chips in a first module 104a. Each of the first drawer 102a, the second drawer 102b, the third drawer 102c, and the fourth drawer 102d may be designed and have components in conformity with one or more of the present embodiments. Details of the first processor chip 106a are shown in FIG. 2. All, some, or one of the other processor chips in the various drawers may include the design as depicted in FIG. 2. FIG. 1 shows that the four drawers each includes four modules, namely four pairs of processor chips (including the first pair also referred to as the first module 104a). The first processor chip 106a may communicate with all of the other processor chips within the first drawer 102a.

In at least some embodiments, an intra-module communication link of the first processor chip 106a with the second processor chip 106b provides faster communication than other communication links provide for the first processor chip 106a to communicate with other processor chips outside of the first module 104a in the first drawer 102a.

Chips within a node, e.g., within a drawer, may communicate with each other in a manner that spends less energy and with a lower latency than occurs for chips communicating with chips outside of the node, e.g., with chips outside of the drawer. When chips within a node communicate with chips on other nodes, e.g., on other drawers, more energy and a greater latency are required than occur for chips communicating with chips inside of the node. When chips communicate with chips on other drawers, more energy and a greater latency are required than occur for chips communicating with chips outside of the module but within the same drawer. Thus, the first processor chip 106a may communicate with each of the other seven chips within the first drawer 102a more easily than the first processor chip 106a may communicate with any of the other processor chips in the second drawer 102b, third drawer 102c, and/or fourth drawer 102d.

The multi-drawer structure 100 depicted in FIG. 1 includes the communication aspect that one of the modules represents a communication portal with a specific other drawer. FIG. 1 shows a first inter-drawer bus 110a which connects the third processor chip (CP-2) in the first drawer 102a with another third processor chip in the third drawer 102c. A similar inter-drawer bus connects the fourth processor chip (CP-3) in the first drawer 102a with another fourth processor chip in the third drawer 102c. Anytime one of the eight processor chips in the first drawer 102a communicates with the one of the eight chips in the third drawer 102c, the communication will be routed via one or both of the third processor chip (via the first inter-drawer bus 110a) and the fourth processor chip (via another inter-drawer bus). Similar exclusive communication connections occur for the chips of the first drawer 102a with the second drawer 102b via the third module of the first drawer 102a and with the fourth drawer 102d via the fourth module of the first drawer 102a. Other drawers, as illustrated in the depicted embodiment, have similar exclusive communication connections via particular modules.

Because communications and data transfer from drawer-to-drawer incur a large latency penalty, working partitions to support a client workload/project are often setup to be stored entirely within the private memory of a single drawer. In other instances based on various factors, such a working partition is spread across multiple drawers. For example, a single working partition may use six of the processor chips on the first drawer 102a and four of the processor chips on the second drawer 102b. Thus, for execution of computing and processing the workload/project in this working partition spread across multiple drawers, inter-drawer transmission and data transfer must occur.

All chips within a particular drawer may share memory, but each or some of the processor chips within the first drawer 102a may have exclusive memory access to particular memory regions of the main memory. For example, in an embodiment the first processor chip 106a has direct access to main memory addresses for 0 to 250 MB, the second processor chip 106b has direct access to main memory addresses for 250 to 500 MB, etc. If any chip, for executing computing and processing, needs to access a memory address within the 0 to 250 MB main memory addresses, that chip must communicate through the first processor chip 106a in order to obtain the data stored in those addresses. Such direct access applies also for chips from other drawers that are involved in a multi-drawer working partition. For example, if a processor chip from the second drawer 102b needs to access main memory addresses within the 0 to 250 MB region, that processor chip must send a notification across the drawer to reach the external drawer (in this instance, to reach the first drawer 102a) and to, more particularly, reach the first processor chip 106a in order to access the data saved in that memory.

In the multi-drawer structure 100 shown in FIG. 1, each of the chips in the first drawer 102a are point-to-point connected. In one embodiment, the memory for a first working partition is local to the first drawer 102a and is spread across each processor chip of the first drawer 102a. In some embodiments, the working partition size is based on the number of active processor cores needed and spreads across multiple drawers, e.g., may be spread across the first drawer 102a and the second drawer 102b. If the first processor chip 106a on the first drawer 102a needs data that is not present in any of its local private caches, the first processor chip 106a needs to check if there is a latest copy of that data portion in the cache of other processor chips within the first drawer 102a. If the latest copy is not available from one of the other caches, then this data portion must be sourced from the main memory. For the first processor chip 106a to retrieve data from any of the memory ports attached to the various processor chips in the first drawer 102a, a single hop is required excluding the local ring communication. For the first processor chip 106a to retrieve data, however, from any of the processor caches on an external node, e.g., on the second drawer 102b, a request must be sent to one of two processor chips within the first drawer 102a that connects to the second drawer 102b. In the depicted example, the fifth and sixth processor chips CP-4 and CP-5 of the first drawer 102a provide the only operative connections for the first drawer 102a to the second drawer 102b. From the chip CP-4 and/or from the chip CP-5 in the first drawer 102a, a request may be transmitted on behalf of the first processor chip 106a from the first drawer 102a and then upon reaching the second drawer 102b be broadcast to all of the chips of the second drawer 102b. Each of the chips of the second drawer 102b will check its respective private cache on the ring, e.g., on a ring equivalent to the first ring topology communication path 222 shown in FIG. 2 and described below. Each of the chips will then aggregate a response and send the response back to the first processor chip 106a on the first drawer 102a by using a similar flow path and the same number of hops that were needed for the first processor chip 106a to transmit the message to the chips of the second drawer 102b.

Thus, the data response from any memory port that is local to a node, e.g., a drawer, is faster than the data response from any remote node, e.g., from any remote drawer. Hence, it is advantageous to provide a remote access array as described herein to track the lines that are being used by remote drawer. This tracking helps to avoid the power and latency delay that are incurred on remote drawer snoops.

Although FIG. 1 shows two processor chips per drawer as providing the sole communication paths to a respective other drawer, in other embodiments a single processor chip per drawer may provide a sole communication path to a respective other drawer. This construction of using a reduced number of chips as a pathway to an external node helps reduce a number of overall buses needed so that construction costs are reduced. This reduced number of chips may refer to some amount of chips less than the total amount in a group, whereby each of the reduced number has a pathway connection to an external node and provides the pathway for the other chips in the group which do not have their own pathway.

While the multi-drawer structure 100 shown in FIG. 1 is used to provide an illustration of a system in which the processor architecture of the present embodiments is implemented, it is understood that the depicted structure is not limiting and is intended to provide an example of a suitable structure in which the techniques of the present embodiments are applied. It should be appreciated that FIG. 1 does not imply any limitations with regard to the structures in which different embodiments may be implemented. Many modifications to the depicted structures may be made based on design and implementation requirements.

FIG. 2 is a processor chip architecture which includes a first remote access array 212 according to at least one embodiment and which shows an example of one of the processor chips depicted in FIG. 1, namely the first processor chip 106a. FIG. 2 shows various components including a motherboard portion 226 which holds the first processor chip 106a and other computer components including those described below.

The first processor chip 106a in the depicted embodiment is divided into eight processor cores, namely a first processor core 202a, a second processor core 202b, a third processor core 202c, a fourth processor core 202d, a fifth processor core 202e, a sixth processor core 202f, a seventh processor core 202g, and an eighth processor core 202h. Each of the processor cores has its own private cache memory. Specifically, the first processor core 202a has a first private cache 204a. The second processor core 202b has a second private cache 204b. The third processor core 202c has a third private cache 204c. The fourth processor core 202d has a fourth private cache 204d. The fifth processor core 202e has a fifth private cache 204e. The sixth processor core 202f has a sixth private cache 204f. The seventh processor core 202g has a seventh private cache 204g. The eighth processor core 202h has an eighth private cache 204h. Each of the individual processor cores may directly communicate with its own private cache and is directly operatively connected to its own private cache.

Each of the individual processor cores may communicate with other caches within the first processor chip 106a via various ring topology communication paths. Each of the individual processor cores may communicate with other caches within the second processor chip 106b of the same shared first module 104a via a first ring topology communication path 222. The first ring topology communication path 222 passes via a first intra-module bus 206a and a second intra-module bus 206b from the first processor chip 106a to the second processor chip 106b. Each of the individual processor cores may communicate with other caches within the other six processor chips of the first drawer 102a, namely with the processor chips of other modules of the first drawer 102a, via a second ring topology communication path 224. The second ring topology communication path 224 passes via an intra-drawer bus 208 from the first processor chip 106a to other processor chips within the first drawer 102a but outside of the first module 104a.

FIG. 2 shows that the eight processor cores of the first processor chip 106a have access to a first main memory region 218 and are operatively connected, e.g., directly operatively connected, to the first main memory region 218. Other processor chips of the first drawer 102a and those included within any working partition that encompasses the first drawer 102a and extends to other drawers may share this first main memory region 218 with the first processor chip 106a. The other chips, however, must access the first main memory region 218 via the first processor chip 106a and via the first memory port 220 to the first main memory region 218. Thus, the other chips must communicate with and through the first processor chip 106a to access this first main memory region 218. The other chips have, likewise, their own respective main memory region which are shared with the other chips including with the first processor chip 106a. Like with the first main memory region 218 being accessible only via the first processor chip 106a, the other main memory regions must be accessed via and through the respective chip that is directly operatively connected to the respective other main memory region.

FIG. 2 shows that the first processor chip 106a has access to a non-addressable memory region 210 and is operatively connected to the non-addressable memory region 210. The non-addressable memory region 210 may be referred to as a hardware system area (HSA) which contains some internal code for operating the chip but is not accessible to regular operating software programs that are being executed by the mainframe. Within the non-addressable memory region 210 a first remote access array 212, a memory coherence directory 214, and a memory control unit 216 may be present. The first remote access array 212 may track when data portions from the first main memory region 218 are pulled to chips on another node, e.g., for the multi-drawer structure 100 shown in FIG. 1 are pulled to chips of the second drawer 102b, the third drawer 102c, and/or the fourth drawer 102d. Table 1 below shows an example of a first remote access array 212 shown in FIG. 2 and which has a capacity limit, e.g., an entry limit, of ten entries. A respective entry may include a memory address indicator in one of the columns, in this example in the first column, which indicates the address regions within the first main memory region 218 that held the data portions requested and/or pulled via chips from external nodes. As, in the shown example, the first main memory region 218 holds addresses in a range of 0 to 250, each of the ten entries is shown as falling within this range.

TABLE 1

Entries of First Remote Access Array

| Address Hash | Drawer ID | Line State | Remote Access ON |
|---|---|---|---|
| Address 124 | 1 | 1 | 1 |
| Address 34 | 1 | 1 | 1 |
| Address 103 | 1 | 1 | 1 |
| Address 104 | — | — | 0 |
| Address 244 | 1 | 0 | 1 |
| Address 78 | 1 | 0 | 1 |
| Address 15 | 3 | 1 | 1 |
| Address 205 | — | — | 0 |
| Address 188 | 1 | 1 | 1 |
| Address 227 | — | — | 0 |

The other columns of the remote access array may include bits which may be set to indicate various information about the pulled data. One such column, e.g., the far right-column in Table 1 provided above, may basically indicate whether the data portion was pulled to an external node. The bit in this column may be changed from a "0" to a "1" when the data portion is pulled to an external node. The bit in this column may be changed from a "1" to a "0" when the entry is scrubbed because the data portion is, for one or more reasons, no longer active or valid in the remote node. Other bits within the remote access array may track a region or the drawer number of the external drawer which requests one or more of the data portions. For example, in Table 1 above the second column indicates a drawer ID of the drawer which accessed the data across the drawer-to-drawer link. Other bits within the remote access array may track a type of fetch operation which requested the one or more the data portions to the external drawer. This fetch operation may be a read-only request or a read and write request. The type of the fetch operation may be indicated by setting one or more respective bits in the first remote access array.

The remote access array may be modifiable to track various sizes of data portions that are pulled by chips from remote nodes. The remote access array may be configured to track a line of data. The data portions may be lines of data and the first remote access array may include a respective first bit per line of data. In this instance of tracking on a line-by-line basis, the remote access array may be more accurate but need to be larger. The pulling, to a remote node, of any line of data stored in the respective main memory region may trigger the creation of an entry in the respective remote access array including at least the setting of the pulled bit. In other instances, the remote access array may track larger data portions instead of individual lines. For example, the remote access array may divide the respective associated main memory region into larger groups of, for example, page sizes of 1 KB (4 lines), 2 KB (8 lines), or 4 KB (16 lines), with each of the various pages containing multiple lines of data. Thus, for this embodiment when any line within one of these regions is pulled to an external node an entry in the remote access array is created for this data region. In these examples, the remote access array may be smaller but be less accurate or precise for helping avoid unnecessary snoops to a remote node.

When any chip whether from the local chip, the local module, or the local drawer, is seeking data from the respective main memory region, e.g., the first main memory region 218, after checking one of their own private caches they may check the caches of other more local chips. If no cache has the sought data portion, the chip may seek the data portion directly from the main memory region. To maintain data coherency the chips may also determine if the data portion has been pulled by a remote node. The use of the remote access array allows the data pulling by remote nodes to be tracked so that unnecessary snoops to those external remote nodes may be avoided. If a first chip seeks data from a respective main memory region and that data has never been pulled by a remote node, then there will be no entry for this data in the remote access array and no snoop to the remote node to confirm the presence or non-presence of that data portion there is required. Thus, the usage of a remote access array such as the first remote access array 212 may reduce the latency of data requests in response to local node misses, reduce a number of requests that are sent on node-node links and thereby conserve bandwidth on those links, save power by avoiding certain cache array lookups on non-home nodes, and conserve physical space on a node by reducing the number of state machines required to process off-drawer requests. The checking of the remote access array may occur simultaneously, e.g., in parallel, with a retrieval from the main memory region, because the retrieval from the main memory region will have a higher latency. The check to the remote access array may indicate whether retrieval must wait for the remote copy or may proceed by taking the copy from the main memory. The remote access array may be checked and retrieval from the main memory region may occur if searches within the local caches were unsuccessful to find a copy of the desired data portion.

FIG. 2 shows the first remote access array 212 which tracks remote data pulling for data from the first main memory region 218. Other chips within the various drawers may include their own respective remote access array which tracks remote data pulling for the respectively associated main memory region that is directly operatively connected to that respective chip. Thus, a respective remote access array per port to a respective main memory region may be implemented within various embodiments.

For example, in at least some embodiments a second main memory region is directly operatively connected to the second processor chip 106b in the first drawer 102a shown in FIG. 1. A second non-addressable memory region is operatively connected to the second processor chip. The second non-addressable memory includes a second remote access array that is configured to track data portions that are pulled from the second main memory region and that are sent to one or more external drawers. This second remote access array may be backed up in the second main memory region.

A computer system, according to at least some embodiments, may include multiple processor chips in the first drawer 102a, multiple main memory regions respectively operatively connected to the multiple processor chips via a respective port, and a respective remote access array per memory port.

The first remote access array 212 in at least some embodiments is backed up in the first main memory region 218. This backing up may include transferring at least one entry of the first remote access array 212 to the first main memory region 218 when a limit of the first remote access array 212 is exceeded. For example, the Table 1 above showing an example of entries in the first remote access array 212 includes room for ten entries. If all ten entries are full to track currently-pulled data regions that have been pulled to a remote node and then if a new data region is pulled to a remote node, one or more of the ten entries may be transferred for storage to the first main memory region 218 because the ten-entry limit of the first remote access array 212 in this embodiment has been exceeded. The one or more entries to remove may be selected based on the amount of time that the entries have been in the remote access array. For example, the entry that has been in the array for the longest time may be selected for removal to the first main memory region 218 for storage there. The one or more entries to remove may be selected based on the main memory area from which the data portions were stored in the first main memory region 218. In other embodiments, data portions that are least-often pulled to a remote node may, upon overflow of the remote access array, be selected for transfer to the main memory region for storage there. The remote access array may include a tracking column which indicates a frequency with which a particular data portion has been pulled. Favoring those data portions which are pulled more frequently may allow more efficient retrieval by requiring retrieval from the first main memory region 218 less frequently.

For the first remote access array 212, additional rules may in some embodiments be enforced regarding granularity of the line tracking and setting of flags based on state of retrieval.

For the granularity, a 1K, 2K, or 4K page basis may be established and a periodic scrubbing mechanism may be implemented when the data portion tracking changes the size of memory chunks which would receive an entry in the remote access array. For example, if the remote access array were tracking on a line-based basis so that each pulled line would receive its own entry in the remote access array and then switched to a page-based basis for tracking so that entries are created in the remote access array when any line in a particular page is pulled, then scrubbing of the entries in the remote access array may be carried out. Vice-versa if the remote access array were tracking on a page-based basis and then switched to a line-based basis for tracking, then scrubbing of the entries in the remote access array may be carried out.

Flags for pages may be shared and added in the remote access array to indicate whether the pages were retrieved in a non-modifiable or modifiable-exclusive state across nodes. These flags may help favor local memory sourcing over snooping and remote data hits. The remote access array may indicate whether a remote node requests a data portion as read-only or in an exclusive state for a write operation. Another attempt to access the data portion by a local chip may check the remote access array to see whether the remote node pulled the copy as read-only or in an exclusive state. If the copy was pulled to the remote node as read-only, the local chip does not need to wait for the response from the remote node. If the copy was pulled as an exclusive state, the local chip must wait for the response from the remote node. Indicating the type of pull from the remote node helps the remote access array add flexibility for the local chips in knowing what types of communication with the remote node are mandatory and which are avoidable.

While the processor chip of FIG. 2 is used to provide an illustration of computer hardware in which a remote access array of the present embodiments is implemented, it is understood that the depicted hardware is not limiting and is intended to provide an example of a suitable computer hardware in which the techniques of the present embodiments are applied. It should be appreciated that FIG. 2 does not imply any limitations with regard to the hardware in which different embodiments may be implemented. Many modifications to the depicted hardware may be made based on design and implementation requirements.

Figure 3:
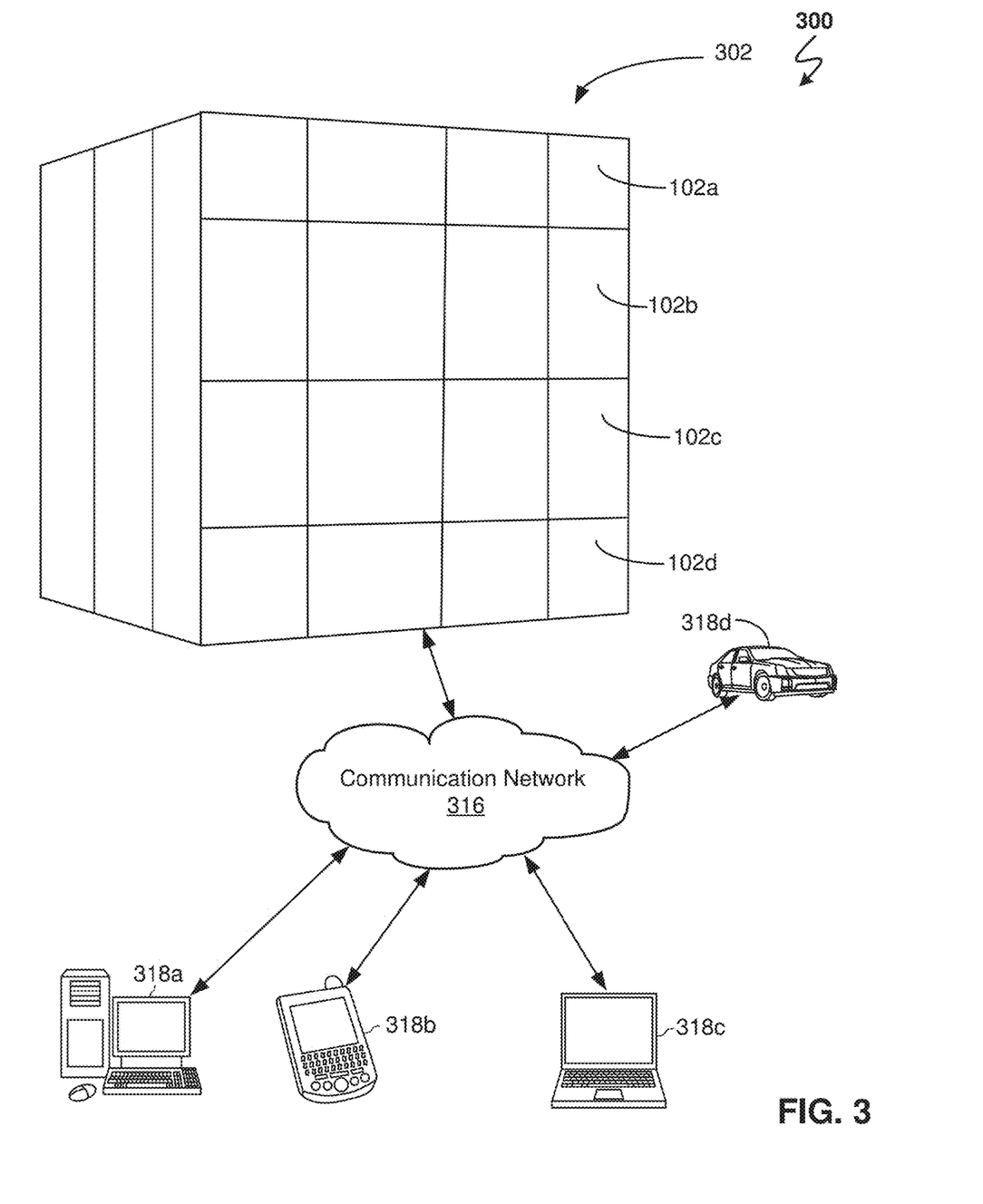
FIG. 3 is a block diagram illustrating a hybrid cloud environment which implements a mainframe in accordance with at least one embodiment which implements a multi-drawer architecture as, for example, depicted in FIG. 1.

FIG. 3 is a block diagram illustrating a hybrid cloud environment 300 in which a mainframe 302 is implemented in accordance with at least one embodiment. A mainframe such as the mainframe 302 is a large computer used by organizations for critical applications, bulk data processing, and/or large-scale transaction processing. A mainframe is a type of server, although all servers are not mainframes and all servers are not created to be equal. The mainframe 302 may help power clouds, build industries, and fuel innovation by enhancing computing power. The mainframe 302 may be implemented as part of a hybrid cloud to preserve privacy of data, achieve cyber resilience, and implement and deploy developed cloud-native capabilities.

The mainframe 302 may implement a multi-drawer architecture. For example, the mainframe 302 may include the multi-drawer structure 100 that was shown in FIG. 1. Thus, the mainframe 302 may include the first drawer 102a, the second drawer 102b, the third drawer 102c, and the fourth drawer 102d that were depicted in FIG. 1 and the communication channels between these drawers as was shown in FIG. 1. The chips on these drawers may host a working partition for a computing/processing project. The working partition may be fit into a single drawer or may be spread across multiple drawers. Each chip may include its own remote access array in order to track the pulling of data to other drawers.

The computing/processing project may be carried out by a variety of other computing nodes which access software and data stored on the mainframe 302. For example, various cloud computing nodes 318 which communicate to operate programs using the mainframe 302 may include computing devices used by cloud consumers, such as, for example, desktop computer 318a, personal digital assistant (PDA) or cellular telephone 318b, laptop computer 318c, and/or automobile computer system 318d. These various nodes may communicate with one another and with the mainframe 302 via the communication network 316. The cloud computing nodes may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of computing devices 318a-d shown in FIG. 3 are intended to be illustrative only and that computing nodes 318 and cloud computing environment 300 can communicate with any type of computerized device over any type of network and/or network addressable connection (e.g., using a web browser).

The communication network 316 may include various types of communication networks, such as a wide area network (WAN), local area network (LAN), a telecommunication network, a wireless network, a public switched network and/or a satellite network. The communication network 316 may facilitate communication of the various cloud computing nodes 318 and the mainframe 302, and particularly to processor chips and memory within the mainframe 302 and the various drawers of the mainframe 302. The communications network 316 may include connections, such as wire, wireless communication links, or fiber optic cables.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

While the hybrid cloud environment 300 of FIG. 3 is used to provide an illustration of an environment in which a remote access array of the present embodiments is implemented, it is understood that the depicted environment is not limiting and is intended to provide an example of a suitable computer environment in which the techniques of the present embodiments are applied. It should be appreciated that FIG. 3 does not imply any limitations with regard to the environment in which different embodiments may be implemented. Many modifications to the depicted environment may be made based on design and implementation requirements.

Figure 4:
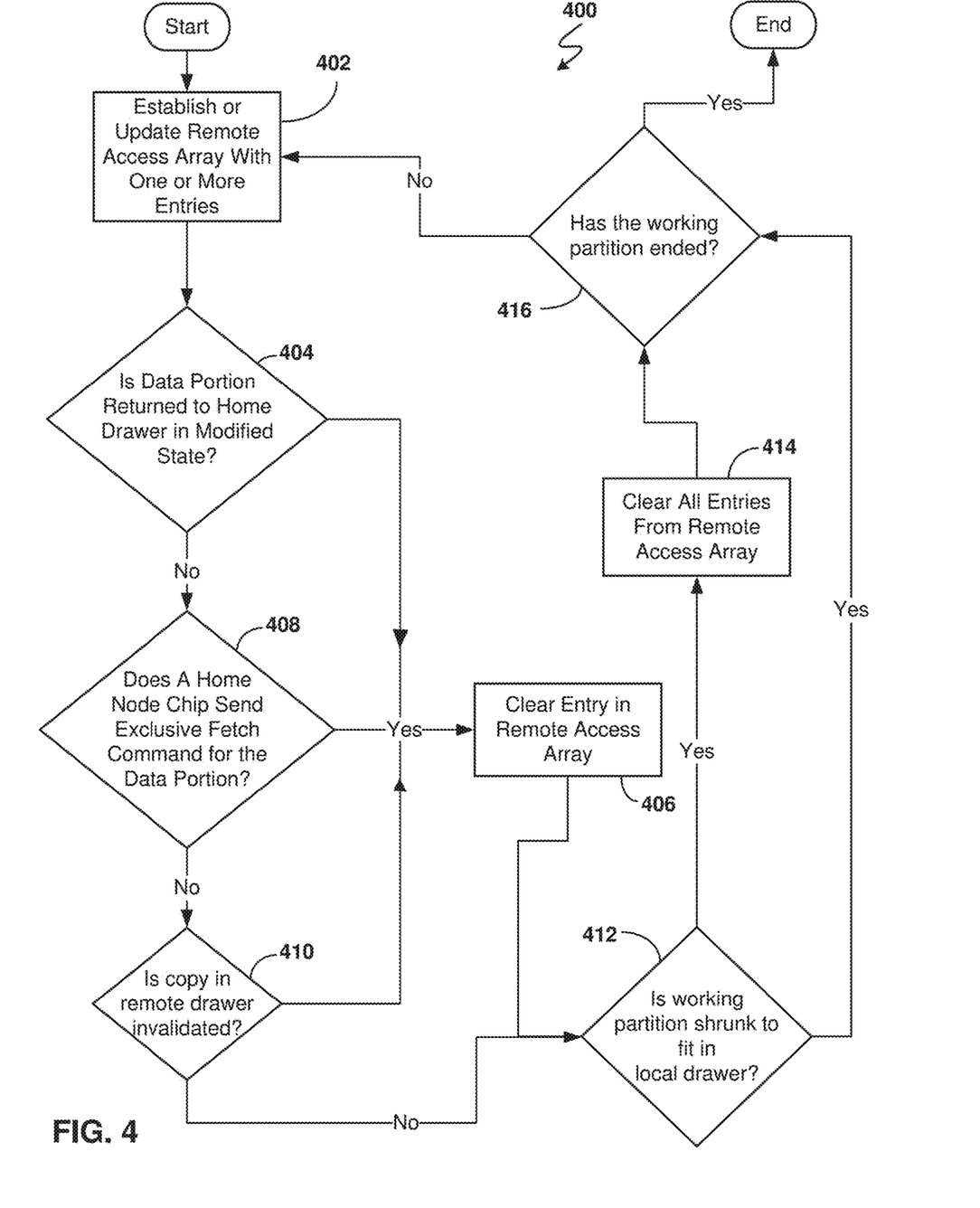
FIG. 4 is an operational flowchart illustrating a remote access array scrubbing process according to at least one embodiment.

FIG. 4 is an operational flowchart illustrating a remote access array scrubbing process 400 according to at least one embodiment. The remote access array scrubbing process 400 may be implemented to manage various remote access arrays, e.g., the first remote access array 212, within a multi-node system. The remote access array scrubbing process 400 describes various instances how the entire remote access array or portions thereof may be scrubbed, e.g., updated, cleared, or removed, based on changes in the system to provide a more up-to-date directory that is useful for managing and reducing data transmissions to remote nodes. The scrubbing helps keep the content of the remote access array accurate over time, which is a challenging task due to data being retrieved and sent back and forth throughout the computer multi-node system.

In step 402 of the remote access array scrubbing process 400, a remote access array with one or more entries is established or updated. The first remote access array 212 in FIG. 2 and described above shows an instance of where the remote access array for step 402 may be present and established. Table 1 above shows examples of a remote access array and various data-tracking entries that it may contain. Adding or removing one or more entries to the first remote access array 212 may constitute updating the remote access array as part of step 402.

In step 404 of the remote access array scrubbing process 400, a determination is made whether a data portion has been returned to a home drawer in a modified state. For example, if a data portion has been pulled to a remote node then an entry will have been created for this data portion within the remote access array. If this data portion has been updated at the remote node and then returned to the home node for storage of the updated data in the main memory region, then the determination of step 404 is affirmative and the remote access array scrubbing process 400 may proceed to step 406. If the determination of step 404 is negative and remotely-pulled data portions have not been returned to the home node in a modified state, then the remote access array scrubbing process 400 may proceed to step 408.

In step 406 of the remote access array scrubbing process 400, the entry in the remote access array is cleared. This entry tracks the data portion which in step 404 returned in a modified state to the home drawer. In some instances, the clearing of step 404 may include changing a set bit from "1" to "0". In some instances, the clearing of step 404 may include deleting the associated entry from the respective remote access array. Thus, if the remote access array held N entries, after the clearing of step 406 the remote access array may hold N−1 entries. In some instances, the clearing of step 406 may include keeping the overall entry but clearing a state-indicating bit of the entry. Thus, if the remote copy changed its state from an exclusive copy to a non-exclusive copy, the entry may remain alive but particular one or more bits that track the particular state may be updated. Scrubbing when multiple bits are used per entry to track additional information may be more complex yet provide enhanced management of the remote access array and the snoops/retrievals that are sent to the remote nodes. The remote access array may allow a snoop in some instances but the snoop may be sent with a known location identification (ID) of the remote copy, so that snoop can efficiently be directed instead of a searching broadcast having to be sent to all remote nodes.

After completion of step 406, the remote access array scrubbing process 400 may proceed to step 412 which is subsequently described.

In step 408 of the remote access array scrubbing process 400, a determination is made whether a home node chip sends an exclusive fetch command for the data portion. If an exclusive fetch command is sent, then other copies of the data portion that may be present in various caches amongst the chips and one or more drawers of the working partition may need to be invalidated and/or evicted from the external node. This data portion referred to in step 408 is a data portion which has been pulled by a remote node and for which an entry has in step 402 been created in the remote access array to track that data. The exclusive fetch may indicate an intention to modify the data copy. If the modification is carried out, that would mean that copies of that data portion held in other caches and/or in the remote node would be out-of-date. The processor core issuing the exclusive fetch command may thereby become and exclusive temporary "owner" of that data portion with respect to modification purposes. To maintain coherency, those other copies need to be invalidated and/or evicted. Pulling this copy to the home drawer in response to the exclusive fetch command is an example of the data being pulled in an exclusive state to the home node.

An invalidation/eviction broadcast to the other nodes/caches may also be received by the remote access array. Receipt of this message lets the remote access array know that one or more entries related to this data portion will need to be scrubbed. If the local processor that issues the intention already has a copy of the data portion, then that local processor needs to invalidate the other copies but not retrieve any new copy. If the local processor that issues the intention does not already have a copy of the data portion, then that local processor needs to retrieve the most recent version of the data portion as well as invalidate the other copies. This retrieval may include retrieving a copy from a remote node. Thus, in this instance the exclusive fetch operation may pull the data portion back from the remote node. This pulling back may include the remote node not keeping a copy, so the remote access array would not need to indicate that the remote node has a copy. Thus, the entry for that data portion may need to be scrubbed in the remote access array.

If the determination of step 408 is affirmative and a home node chip has sent an exclusive fetch command for the data portion, then the remote access array scrubbing process 400 may proceed to step 406. Step 406 was described above and may be performed after step 408 in addition to or alternatively to being performed directly after step 404. If the determination of step 408 is negative and no exclusive fetch command has been generated and sent for the data portion, then the remote access array scrubbing process 400 may proceed to step 410.

In step 410 of the remote access array scrubbing process 400, a determination is made whether a copy in the remote drawer is invalidated. This copy of step 410 refers to a data portion which has been pulled by a remote node and for which an entry in the remote access array of step 402 has been created to track same. This copy may have been pulled in an exclusive state to the remote node. The invalidation and/or instruction to cause the invalidation may reach the remote access array so that the remote access array may be scrubbed for this entry. In some embodiments, to make an affirmative determination for step 410 it may also be required that the remote copy have been in an exclusive state along with requiring that the remote access array receive notification of the eviction/invalidation of that remote copy. This eviction may in some instances be referred to as a line replacement unit (LRU) cast-out.

If the determination of step 410 is affirmative and a copy in the remote drawer has been invalidated, then the remote access array scrubbing process 400 may proceed to step 406.

Step 406 was described above and may be performed after step 410 in addition to or alternatively to being performed directly after steps 404 and/or 406. If the determination of step 410 is negative and no copy in the remote drawer has been invalidated which may mean that the entries in the remote access array are current, then the remote access array scrubbing process 400 may proceed to step 412.

In step 412 of the remote access array scrubbing process 400, a determination is made whether the working partition is shrunk to fit in the local drawer. The remote access array that was established or updated in step 402 belongs to this working partition that is evaluated in step 412. For example, if the working partition initially extends across multiple drawers such as the first drawer 102a and the second drawer 102b and then is shrunk to fit exclusively in the first drawer 102a, the entries for the remote access array are not needed. The remote access array serves to help manage snooping to remote nodes and to reduce snooping to remote nodes. If no remote node is part of the working partition, then the previous entries are not needed. If the determination of step 412 is affirmative and the working partition has been shrunk to fit in the local drawer, then the remote access array scrubbing process 400 may proceed to step 414. If the determination of step 414 is negative and the working partition has not been shrunk to fit within the local drawer, then the remote access array scrubbing process 400 may proceed to step 416.

In some embodiments, a dynamic memory relocation (DMR) may be implemented to shrink a working partition from multiple drawers to a single drawer. Thus, for this embodiment the step of 412 may include the receiving of a dynamic memory relocation signal. The reception of this dynamic memory relocation signal at the respective processor may trigger the scrubbing of all of the entries in the first remote access array 212.

In step 414 of the remote access array scrubbing process 400, all entries are cleared from the remote access array. This remote access array is the one that was established and/or updated in step 402. In some instances, the clearing of step 414 may include changing a respective set bit from "1" to "0" for each of the entries. In some instances, the clearing of step 414 may include deleting all entries from the respective remote access array. Thus, if the remote access array held N entries, after the clearing of step 414 the remote access array may hold zero entries. The remote access array would then be ready and in a clean state to accept new entries if the working partition is thereafter changed again to extend across multiple drawers.

In step 416 of the remote access array scrubbing process 400, a determination is made as to whether the working partition has ended. The remote access array that was established or updated in step 402 belongs to this working partition that is evaluated in step 416. If a computing/processing project has ended so that the workload partition is no longer needed, then the working partition may conclude. With the working partition no longer operating, the remote access array is no longer needed and managing and updating the remote access array no longer needs to be carried out. If the determination of step 416 is affirmative and the working partition has ended, then the remote access array scrubbing process 400 may end. If the determination of step 416 is negative and the working partition has not ended, then the remote access array scrubbing process 400 may proceed to step 402 for a repeat of one or more of steps 402, 404, 406, 408, 410, 412, and 414. Thus, the remote access array scrubbing process 400 may continue for the life of a working partition.

In some instances a memory clear operation to the main memory region may trigger invalidating the data copies in all caches that were copies of the written-over region in the main memory. A memory clear operation may write directly to memory which causes the cache copies to be outdated. In this instance, all remote access array entries corresponding to the written-over region may be cleared because they are no longer up-to-date. The remote access array may receive a memory clear signal and address of a written-over line, so that the remote access array may in response clear the remote access array entry for that line. A similar clearing of the remote access array or an entry in the remote access array occurs for a direct memory access (DMA) which writes directly to memory.

Although the remote access array scrubbing process 400 of FIG. 4 is described as occurring with terminology of "a" remote access array, in at least some embodiments the remote access array scrubbing process 400 may be performed with multiple remote access arrays, e.g., with two remote access arrays or with a remote access array per memory port for the main memory for the working partition.

The remote access array and management thereof described herein may even be implemented in memory structures in which the home node and non-home node have comparable cache sizes and non-inclusive caches. The remote access array and management thereof may be implemented even if the number of remote nodes in the system scales and increases to a number greater than 1. The present embodiments minimize broadcast across different nodes by tracking the states of lines pulled by a remote node. The present embodiments avoid inevitable broadcast across different nodes and reduce the frequency of such node-to-node transmissions. The triggers for scrubbing the remote array access may come from messages sent from the remote node to the local chip that hosts the respective remote array access. The triggers for scrubbing the remote array access may additionally and/or alternatively come from messages sent to the local chip from somewhere else on the local drawer.

It may be appreciated that FIG. 4 provides only illustrations of certain embodiments and does not imply any limitations with regard to how different embodiments may be implemented. Many modifications to the depicted embodiment(s) such as to an order of the steps performed may be made based on design and implementation requirements.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
a first drawer comprising a first processor chip,
a first main memory region operatively connected to the first processor chip, and
a first restricted access memory region operatively connected to the first processor chip, the first restricted access memory region comprising a first remote access array configured to track data portions stored in the first main memory region and for which copies were created and sent to an external node while the data portions are still maintained in the first main memory region;
wherein the first remote access array is backed up in the first main memory region.

2. The computer system of claim 1, wherein the first remote access array being backed up in the first main memory region comprises transferring at least one entry of the first remote access array to the first main memory region when a limit of the first remote access array is exceeded.

3. The computer system of claim 1, wherein the data portions are lines of data and the first remote access array includes a respective bit per line of data.

4. The computer system of claim 1, wherein the first remote access array tracks the data portions by setting a respective bit per data portion in response to a respective copy of the stored data portion being retrieved from the first main memory region and sent to the external node.

5. The computer system of claim 1, wherein the first remote access array tracks a region of the external node which requests one or more of the data portions, the region of the external node being indicated by setting one or more respective bits in the first remote access array.

6. The computer system of claim 1, wherein the first remote access array tracks a type of fetch operation which requested one or more of the data portions to the external node, the type of the fetch operation being indicated by setting one or more respective bits in the first remote access array.

7. The computer system of claim 1, wherein the first remote access array comprises an entry for a particular data portion and is configured to clear the entry in response to the data portion being invalidated in the external node.

8. The computer system of claim 1, further comprising:
a second processor chip in the first drawer;
a second main memory region operatively connected to the second processor chip, and a second restricted access memory region operatively connected to the second processor chip, the second restricted access memory region comprising a second remote access array configured to track data portions stored in the second main memory region and for which copies of the stored data portions were created and sent to one or more external nodes while the data portions are still maintained in the second main memory region;
wherein the second remote access array is backed up in the second main memory region.

9. The computer system of claim 1, further comprising multiple processor chips in the first drawer, multiple main memory regions respectively operatively connected to the multiple processor chips via a respective port, and a respective remote access array per memory port.

10. The computer system of claim 1, wherein the first remote access array comprises an entry for a particular data portion and is configured to clear the entry in response to the data portion being returned to the first drawer in an exclusive state.

11. The computer system of claim 1, wherein the first remote access array comprises an entry for a particular data portion and is configured to update the entry in response to a state of the data portion on the external node being modified.

12. The computer system of claim 1, wherein the first remote access array comprises one or more entries and is configured to clear all of the one or more entries in response to a multi-drawer working partition that includes the first drawer being reduced in storage distribution space and stored entirely within the first drawer.

13. The computer system of claim 12, wherein a dynamic memory relocation signal triggers the updating of all of the one or more entries in the first remote access array.

14. The computer system of claim 1, wherein the external node is an external drawer.

15. A method for data tracking, the method comprising:
setting a bit in a first remote access array in response to a copy of a data portion that is being stored in a first main memory region being created and sent to an external node while the data portion is still maintained in the first main memory region, the first remote access array being stored in a first restricted access memory region operatively connected to a first processor chip of a first drawer; and
backing up the first remote access array in the first main memory region.

16. The method of claim 15, wherein the backing up comprises sending an entry of the first remote access array for storage in the first main memory region in response to a size limit of the first remote access array being exceeded.

17. The method of claim 15, further comprising setting one or more location bits in the first remote access array to track a region of the external node which requested the data portion.

18. The method of claim 15, further comprising clearing the set bit in the first remote access array in response to the data portion being invalidated in the external node.

19. The method of claim 15, further comprising clearing all entries of the first remote access array in response to a multi-drawer working partition that includes the first drawer being reduced in storage distribution space and stored entirely within the first drawer.

20. A computer system comprising:
a first drawer comprising a first processor chip,
a first main memory region operatively connected to the first processor chip, and
a first restricted access memory region operatively connected to the first processor chip, the first restricted access memory region comprising a first remote access array configured to track data portions stored in the first main memory region and for which copies were created and sent to an external node while the data portions are still maintained in the first main memory region;
wherein the first remote access array comprises one or more entries and is configured to clear all of the one or more entries in response to a multi-drawer working partition that includes the first drawer being reduced in storage distribution space and stored entirely within the first drawer.

* * * * *